(12) United States Patent
Yang et al.

(10) Patent No.: US 7,602,806 B2
(45) Date of Patent: Oct. 13, 2009

(54) SIGNALING AND CODING METHODS AND APPARATUS FOR LONG-RANGE 10 AND 100 MBPS ETHERNET TRANSMISSION

(75) Inventors: Kewei Yang, Saratoga, CA (US); Jianbin Hao, San Jose, CA (US); Fei Yao, San Jose, CA (US); Ning Zhu, San Jose, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 787 days.

(21) Appl. No.: 11/005,686

(22) Filed: Dec. 7, 2004

(65) Prior Publication Data

US 2005/0135413 A1  Jun. 23, 2005

Related U.S. Application Data

(60) Provisional application No. 60/527,275, filed on Dec. 8, 2003.

(51) Int. Cl.
 *H04L 12/28* (2006.01)
 *H04J 3/16* (2006.01)
 *H04B 1/66* (2006.01)
(52) U.S. Cl. .................. 370/465; 370/395.1; 370/469; 370/419; 375/240
(58) Field of Classification Search ............ 370/412, 370/420, 395.2, 395.5, 419, 252, 445, 449, 370/250, 466, 389, 465, 296, 396, 247, 282; 375/219, 220
See application file for complete search history.

(56) References Cited

U.S. PATENT DOCUMENTS 5,614,905 A  3/1997  Crane (Continued)

FOREIGN PATENT DOCUMENTS

CN  1234952  11/1999

(Continued)

OTHER PUBLICATIONS

IEEE Standard 802.3U-1995, "Physical Layer link signaling for 10 Mb/s and 100 Mb/s Auto-Negotiation on twisted pair", 1995, pp. 235-244.

(Continued)

*Primary Examiner*—Hanh Nguyen
(74) *Attorney, Agent, or Firm*—Blakely Sokoloff Taylor & Zafman LLP (57) ABSTRACT

Signaling and coding methods and apparatus for long-range 10 and 100 mbps Ethernet transmission. In accordance with the method, a physical layer (PHY) device is provided that includes the long-range capabilities. In operation, the PHY measures the distance to a companion PHY, and if it is within the specification limits, communicates with the companion device in the normal way. If the distance is above the specification limits, the PHY checks to see if the companion PHY is similarly enabled, and if so, switches to a long-range signaling method. In a preferred embodiment, NRZ coding with pre-emphasis on the first bit of two or more bits of the same value is used for a first range exceeding the specification limit, and PAM4 coding is used for a second range exceeding the first range. Various embodiments are disclosed.

19 Claims, 4 Drawing Sheets

U.S. PATENT DOCUMENTS

| | | | |
|---|---|---|---|
| 5,677,651 A | 10/1997 | Crane | |
| 6,198,727 B1 * | 3/2001 | Wakeley et al. | 370/247 |
| 6,741,612 B1 * | 5/2004 | Butler et al. | 370/501 |
| 6,975,637 B1 * | 12/2005 | Lenell | 370/412 |
| 7,068,609 B2 * | 6/2006 | Huff | 370/252 |
| 7,161,911 B1 * | 1/2007 | Fang et al. | 370/282 |
| 2002/0041571 A1 | 4/2002 | Huff | |
| 2003/0018776 A1 | 1/2003 | Yoon et al. | |
| 2003/0021349 A1 | 1/2003 | Jiang et al. | |

FOREIGN PATENT DOCUMENTS

| | | |
|---|---|---|
| EP | 0 299 639 A2 | 1/1989 |
| WO | WO-95/34976 A1 | 12/1995 |
| WO | WO-98/19481 | 5/1998 |

OTHER PUBLICATIONS

Everitt, James et al., "A CMOS Transceiver for 10-Mb/s and 100-Mb/s Ethernet", IEEE Journal of Solid-State Circuits, Dec. 1998, pp. 2169-2177, vol. 33, No. 12.

Pahlavan, Kaveh, "Lecture 2: IEEE 802.3 Ethernet", Telecommunication Laboratory and CWC: Local Area Networks, May 9, 2003, University of Oulo, Finland.

* cited by examiner

|  | Distance [in meters] | | |
|---|---|---|---|
| Data Rate [Mbps] | Standard | w/Pre-emphasis | w/PAM4 |
| 10 | 150 | n/a | 500 |
| 100 | 150 | 200 | 300 |

Fig. 5

SIGNALING AND CODING METHODS AND APPARATUS FOR LONG-RANGE 10 AND 100 MBPS ETHERNET TRANSMISSION

CROSS-REFERENCE TO RELATED APPLICATION

This application claims the benefit of U.S. Provisional Patent Application No. 60/527,275 filed Dec. 8, 2003.

BACKGROUND OF THE INVENTION

1. Field of the Invention

The present invention relates generally to physical connectivity of Ethernet device, and more particularly, to the ability to communicate over the Ethernet using 10 Mbps or 100 Mbps transmission rates over distances that are 5 to 10 times longer then the current standards.

2. Prior Art

Ethernet connectivity based on the 10BASE-T and 100BASE-TX standards (known as IEEE standard 802.3) is one of the most important technologies in the networking industry today. These standards enable Ethernet communication at 10 Mega bits per second (Mbps) and 100 Mbps respectively. To enable this connectivity, a device transferring the generally digital signaling to signals that can be transmitted over larger distances is used. This device is responsible for the physical layer, which is the first layer of the standard communication model, and is often referred to as the PHY device, which is considered to be one of the key components in the Ethernet solution. It is the characteristics of the PHY that determine the system's capabilities to communicate over the distances mandated by the various Ethernet standards.

In the past decade, due to the rapid increase in the use of the Internet, 10/100 Mbps installations of Ethernet ports have increased exponentially, and the trend continues. With Ethernet being for all practical purposes the network solution of choice for enterprises, campus LAN, small offices and home offices as well as other networked industry applications, this trend is even stronger. In turn, these lead to the tremendous demands for 10BASE-T and 100BASE-TX Ethernet PHY devices, both single port and multi-port.

However, it is not only a numbers game for the 10BASE-T and 100BASE-TX, i.e., the number of ports actually installed. There is a strong trend for a demand for new and higher requirements from features and performance. For example, new features like Power-over-Ethernet, automatic cable diagnostics, polarity and medium dependent interface (MDI) and MDI crossover (MDIX) automatic correction, and so on, as well as higher performance requirements on power consumption, footprint, reliability, tolerance on temperature and power supply, surge and electrostatic discharge (ESD) protection, and the like, are commonly required in new Ethernet deployment.

Another important requirement is that of connectivity distance, a challenge facing a significant problem. Due to the fact that 10BASE-T and 100BASE-TX Ethernet standard (IEEE 802.3) was developed almost twenty years ago, the PHY devices developed based on that standard have a driving distance of 100 to 150 meters (without using a repeater), over a shielded or unshielded twisted pair. At that time this was considered a long enough distance for all the foreseeable and practical applications. However, as 10/100 Mbps Ethernet is used in more and more types of environments and scenarios, and the cost and ease of deployment is getting more and more important, the originally specified encoding schemes and the driving distances are hindering efficient deployment in an increasing number of situations. With requirements of up to 300 meters for 100BASE-TX and up to 500 meters for 10BASE-T for Ethernet connectivity, it can easily be shown that the IEEE standard (802.3) cannot support these driving distance requirements.

It would therefore be advantageous to provide a PHY that would be fully backward compatible with the existing 10BASE-T and 100BASE-TX PHY devices, but provide a significantly extended driving distance using a shielded or unshielded twisted pair. It would be further advantageous if such new PHY device would be capable of an auto-negotiation protocol to enable automatic switching between normal and long-range operation.

DETAILED DESCRIPTION OF THE PREFERRED EMBODIMENTS

Figure 1:
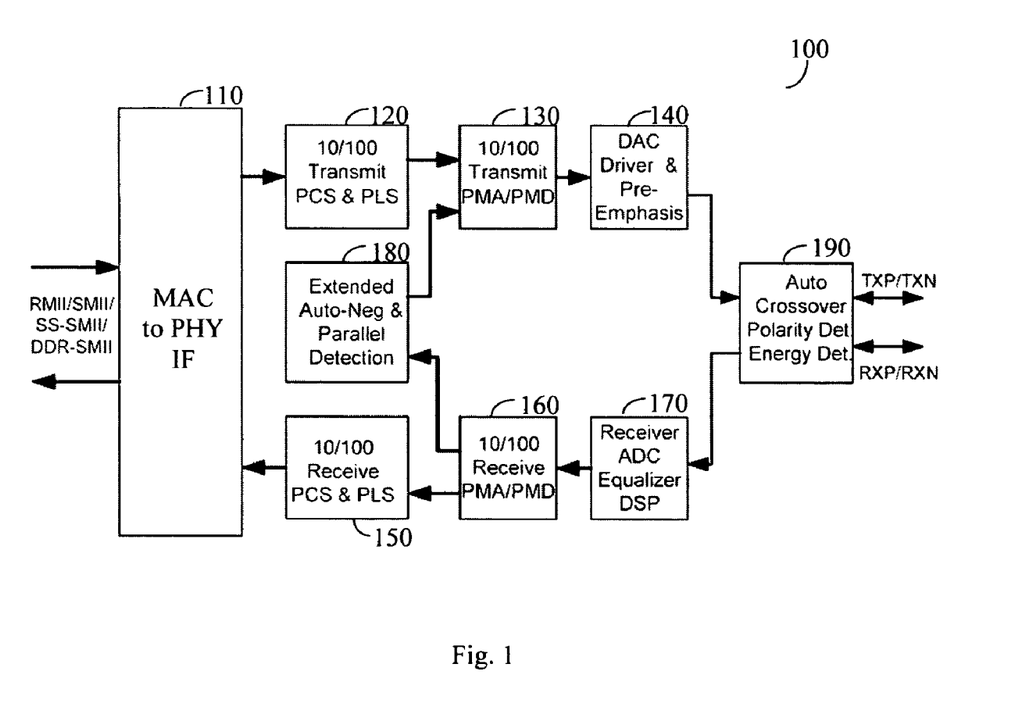
FIG. 1 is a schematic block diagram of an extended range PHY in accordance with the disclosed invention.

Reference is first made to FIG. 1 where a non-limiting exemplary block diagram 100 of an extended range physical layer device (PHY) is shown. The PHY 100 comprises several blocks that are commonly used in the industry as well as certain unique or modified blocks that enable an extended range beyond the original definitions of the 10BASE-T and 100BASE-TX standards as defined by IEEE 802.3 for transmission over a shielded or unshielded twisted pair.

Block 110 comprises the interface between the physical layer, i.e., the actual wires that transmit the physical signals, and the media access device (commonly referred to as MAC). In addition, the block contains first-in first-out (FIFO) buffers to handle the traffic between the PHY and MAC devices. Traffic is bi-directional, i.e., data may be sent from the PHY to the MAC when data is received on the wires, as well as data may be sent from the MAC to the PHY for the purpose of transmitting such data over the physical wires. An auto crossover polarity and energy detector 190 is used to ensure that the polarity of the connectivity corresponds to the correct direction of communication over the twisted pair. This avoids the need to have a separate uplink port, and has become a standard unit in modern PHY implementations. The energy detector provides further indication of the energy provided by a signal received by PHY 110, and may be further used by the DSP of block 170 as explained in more detail below.

Blocks 120 and 150 handle the transmit and receive functions for both 10 and 100 Mega bits per second (Mbps) transmission. For 10 Mbps, transmission and reception blocks 120 and 150 implement all the functionalities in the physical link signaling (PLS) unit and some of the functionalities in the media access unit (MAU) sub-layer. These include Manchester encoding, Manchester decoding, Input and Data Valid function, Error Sense function, Carrier Sense function, Collision Presence function, Input and Output function, Jabber function, SQE Message Test function, Loop-back function, and Clock and Data Recover function. For 100 Mbps transmission and reception blocks 120 and 150 implement all the functionalities in the physical coding sub-layer (PCS) such as 100BASE-TX, 100BASE-FX and 10/100BASE-LR, including the 4-bit/5-bit (4 b/5 b) encoding/decoding functions. Furthermore, they implement the state diagrams of Transmit Bits, Transmit, Receive Bits, Receive and Carrier Sense.

Blocks 130 and 160 handle the transmit and receive, respectively, of the physical medium attachment (PMA) and the physical medium dependent (PMD) sub-layer functions. These blocks implement functions such as scrambling and de-scrambling, MLT-3 encoding and decoding for 100 Mbps, 1:2 multiplexing and 2:1 multiplexing for 10 and 100 Mbps modes, converting the PCS sub-layer's non-return to zero (NRZ) format data to PMA sub-layer's NRZI format data. It also implements the Far End Fault Indication (FEFI) function that includes the Far End Fault Generate state diagram and Far End Fault Detect state diagram.

In order to extend the transmit distance when the device works in the regular 100BASE-TX mode, a digital signal processor (DSP) is integrated with the digital to analog converter (DAC) 140 for the purpose of performing a pre-emphasis function. A DSP is also integrated as part of the receiver analog to digital converter (ADC) and equalizer 170. Based on information processed by the DSP of ADC 170, the DSP of DAC 140 and the specific settings, discussed in more detail below, a decision is made on the specific use of the pre-emphasis function of DAC 140. Once the DSP pre-emphasis setting is changed such as a new setting or from no pre-emphasis to pre-emphasis, auto-negotiation takes place if this function is enabled; otherwise, a procedure of forcing the link down for 1200 to 1500 milliseconds and then transmit idle takes place. This takes place in order to make the link partner recognize the link down event and re-start the linkup procedure from the beginning. A more detailed explanation of the pre-emphasis function is provided below. In a preferred embodiment of this invention, devices on both ends of the link have long-range capabilities and therefore the DSP of ADC 170 is capable of detecting these capabilities and allowing a greater distance of operation.

Figure 2:
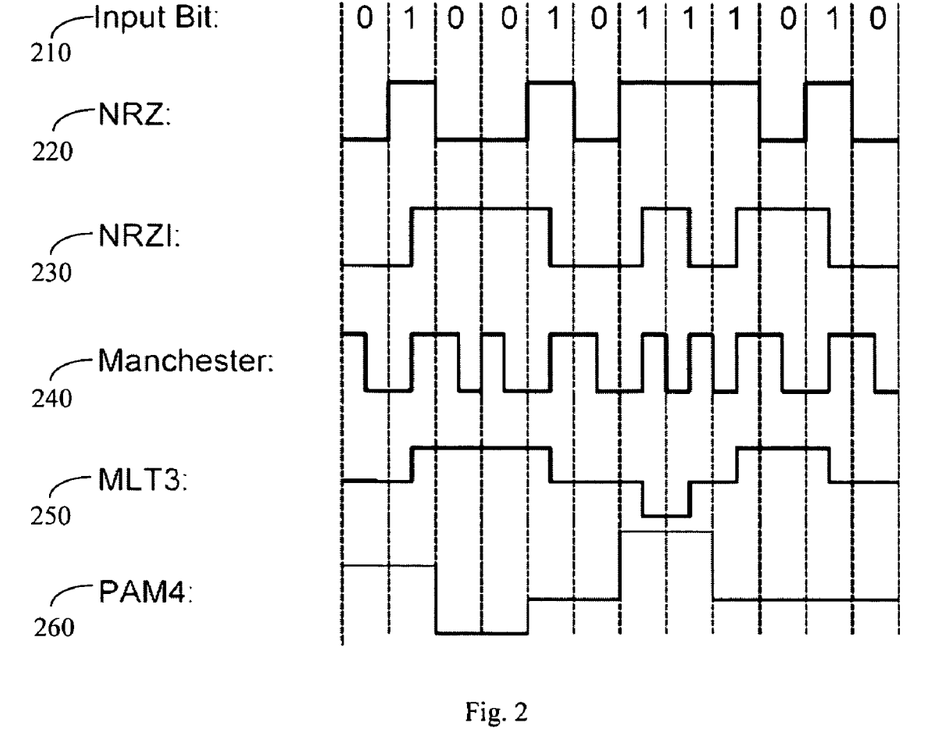
FIG. 2 is a timing diagram of various bit encoding schemes.

Reference is now made to FIG. 2 where a timing diagram of bit coding schemes is shown. A stream of input bits 210 must be first serialized and then transmitted over the transmission lines. Over time, various schemes have been developed in order to obtain better signal-to-noise ratios (SNR). It is desirable to have a high as possible SNR to guarantee a high quality of communication, i.e., reducing the bit error rate (BER) that requires re-transmission of data, effectively reducing the network bandwidth. For 10 Mbps and 100 Mbps, the coding commonly used are those of non-return to zero (NRZ) 220, non-return to zero inverted (NRZI) 230, Manchester coding 240 and multi-level transmit-3 levels (MLT3) 250. The NRZ scheme is commonly used in low-speed communications but has the problem of long sequences of '0's or '1's that would cause the clock extraction to be practically impossible, as it is quite common to have long series of zeros or ones. Therefore it is common to find the use of the Manchester encoding instead. In the Manchester coding there will always be a transition at the center of the bit to indicate its value, for example, transition from '1' to '0' denoting a logical '0' value and a '0' to '1' transition to denote a '1' value. Manchester encoding guarantees transitions on both "1" and "0", however, this naturally causes the system to operate at a higher frequency as seen in the example. The MLT3 introduces three levels to transmit the data over the lines. For MLT3 Encoding scheme, a bit "0" is encoded as no transition (keeping the same signal level); a bit "1" is encoded as a signal level transition of low to middle, or middle to high, or high to middle, or middle to low, depending on the previous transition. Both MLT3 and NRZI guarantee transition on "1", but MLT3 is favorable due to electromagnetic interference (EMI) considerations.

In high-speed Ethernet, such as 1 Giga bit per second (Gbps) and above, another coding scheme is used, commonly referred to as pulse amplitude modulation, and for short PAM4 or 4PAM. According to this coding scheme a symbol is sent each clock and a symbol consists of two bits at a time. As can be seen in the example signal 260 in FIG. 2, each symbol, i.e., '00', '01'. '10', and '11', has its unique level in the transmission. This effectively halves the frequency of symbols to achieve the same data rate. While normally PAM4 is used for its superior SNR qualities for high bit rate systems, the inventors have found that applying this coding scheme on 10 and 100 Mbps Ethernet, extends significantly the range in which a 10 Mbps and 100 Mbps systems can operate. Specifically, the delta achieved in signal to noise ratio (SNR), is used to achieve a longer transmission distance.

Initially it is necessary for a device designed in accordance with this invention to detect whether the other device is capable of supporting long-range capabilities. IEEE 802.3 defines an auto-negotiation procedure so that two link partners are able to automatically negotiate a commonly acceptable link speed (e.g., 10 Mbps or 100 Mbps), duplex modes (half duplex or full duplex) and other features. By extending the protocol, for example through the use of the DSP units in DAC 140 and ADC 170, it is possible to detect the distance between the two units. While the distance could be determined in various ways, one method is to measure the energy of the signal to estimate the distance it has traveled. While not very accurate, it is also not necessary to be a very accurate measurement, but rather good enough for the purposes of deciding which of the communication algorithms to use. By having simulations of typical signal energy patterns for various distances, the system can estimate that distance and the algorithm may decide which of the transmission protocols to select.

If the two units are at a distance that is above the standard but below a first range, then the pre-emphasis may be used to reach the higher distance. This will commonly occur if on one side, the device is designed in accordance with the disclosed invention, while the other device is a standard PHY. If the distance is longer than such first range then it can be assumed, and thereafter confirmed, that the other side also has a PHY designed in accordance with the disclosed invention, or otherwise is PAM4 enabled, and therefore setting for PAM4 communication should take place. With PAM4 encoding, the system is capable of communication in ranges of 500 meters and above.

Figure 3:
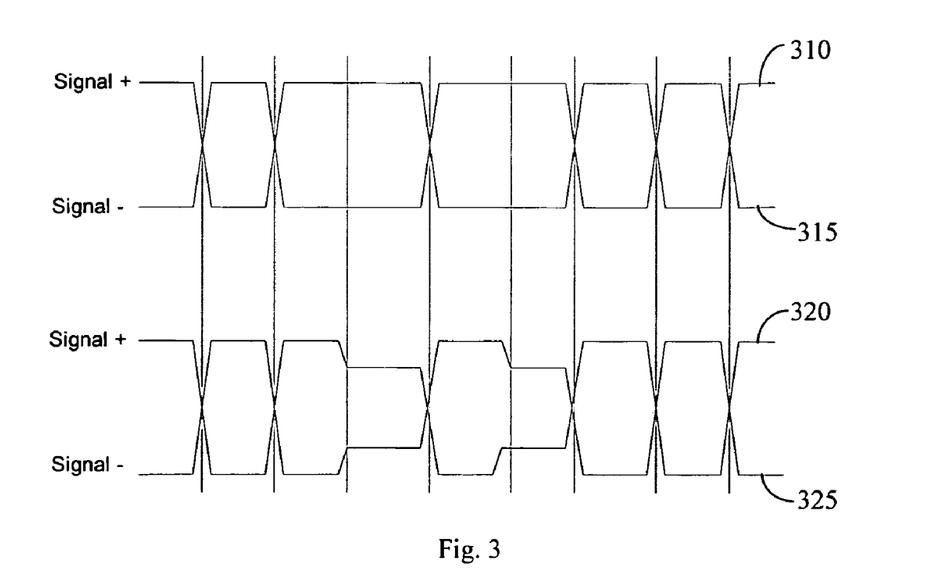
FIG. 3 is an exemplary signal chart for the operation of the pre-emphasis function.

Reference is now made to FIG. 3 where a signal diagram of an NRZ signal before (310, 315) and after (320, 325) the pre-emphasis process is shown. When the DSP of the receiver analog to digital converter (ADC) and equalizer 170 indicates that a certain level of transmit pre-emphasis is needed, the DSP of DAC 140 performs a pre-emphasis on the data to be transmitted by the analog transmitter. Signals 310 and 315 are the signals sent before pre-emphasis is performed. If pre-emphasis is necessary, signals 310 and 315 are modified by the pre-emphasis process and output as signals 320 and 325 respectively. As can be seen in FIG. 3, pre-emphasis effectively modifies the signal levels of adjacent bits (two or more) having the same value, i.e., a certain emphasis to the signal is added bringing it above the absolute value of the originally to be transmitted signal. The number of bits and the magnitude of changes in the levels may be determined by the distances between the two link partners which are provided by the DSP of the receiver analog to digital converter (ADC) and equalizer 170. The pre-emphasis itself is implemented using a finite impulse response (FIR) type filter such as:

$$y(n)=a_0x(n)+a_1x(n-1)+a_2x(n-2)+\ldots+a_kx(n-k)$$

where y(n) is the output of the pre-emphasis block and x(n) is the input to the pre-emphasis block.

In a preferred embodiment, the pre-emphasis level is programmable. Therefore it is possible to have a signal with pre-emphasis that is not necessarily beyond the spec. Also, the signal only needs to be within the specification requirements as received by the link partner. Thus momentary pre-emphasis above specification limits for the purpose of decreasing the rise time of the signal as received by the link partner within specification limits can be implemented. Also, in FIG. 3, pre-emphasis for an entire bit time is indicated, though this is not a limitation of the invention. Pre-emphasis may be longer, or more likely, shorter in duration as desired.

Figure 4:
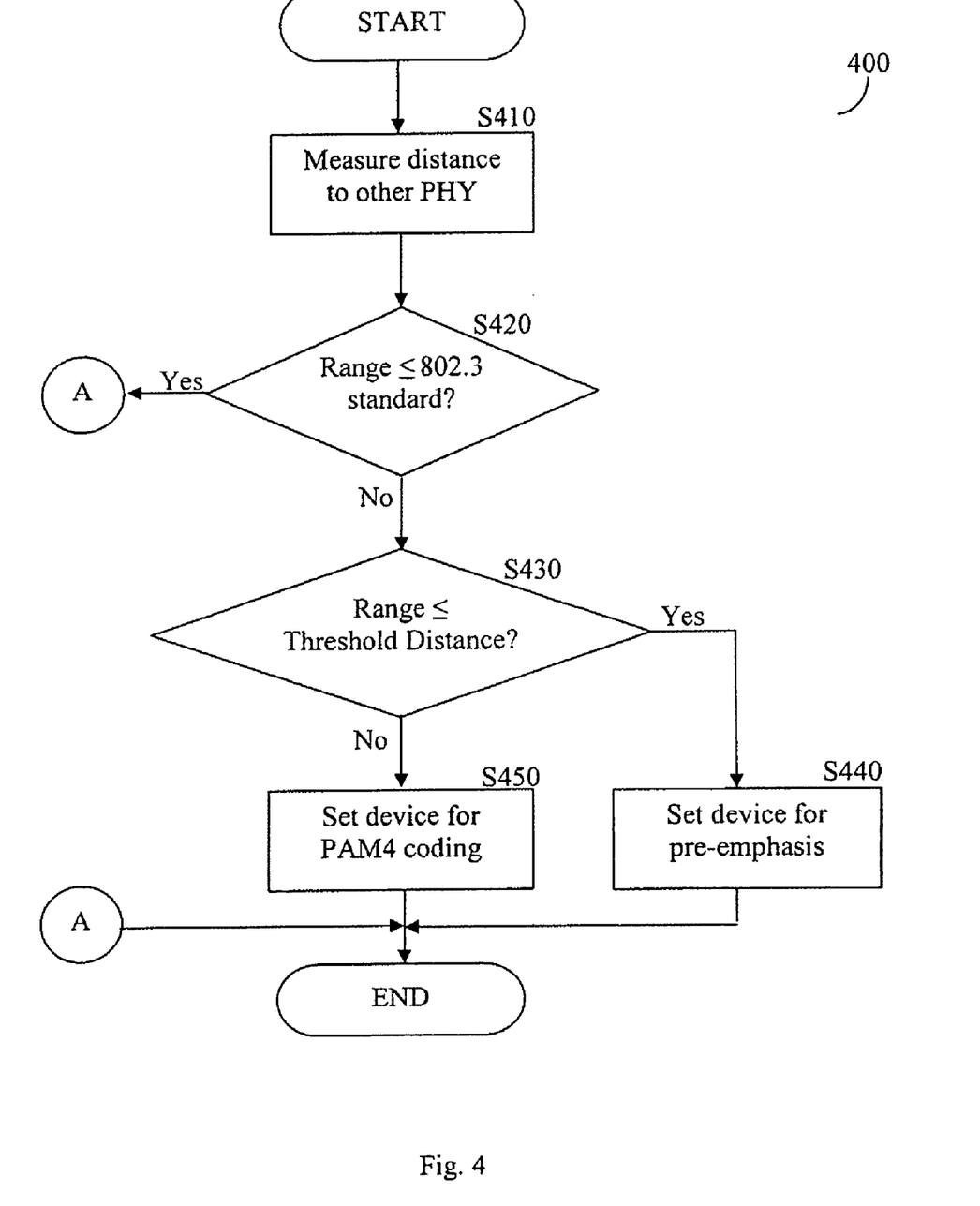
FIG. 4 is an exemplary flowchart of the range detection portion for the setting of the PHY.

Reference is now made to FIG. 4 where a non-limiting exemplary flowchart 400 of the range detection portion of the setting of the PHY designed in accordance with the disclosed invention is shown. In step S410 the distance between the PHY devices is detected. This can be initiated by a master PHY device that is responsible for the determination of the distance. In step S420 it is determined whether the distance is within the distances supported by the IEEE 802.3 standard for either 10BASE-T or 100BASE-TX, and if it is not, special setting is required, as the default setting is for the standard operation mode; otherwise, execution continues with step S430. In steps S430 it is determined if the range is above a predetermined value, for example 500 meters. If the range is below that threshold distance, i.e., above the range defined by IEEE 802.3 but less then the predetermined extended range, the execution continues with step S440 where the device is set to activate the pre-emphasis function, as explained above; otherwise, execution continues with step S450. In step S450 the device is set to enable the PAM4 coding and encoding which allows for operation beyond the predetermined extended threshold and to a long-range of 500 meters or more. A person skilled-in-the-art would appreciate that it would be possible, for example, to enable PAM4 coding and encoding if the transmission originally was detected as requiring only pre-emphasis but still fails to communicate properly. Further, if when NRZ coding with pre-emphasis is called for, it is determined that the other device is not enabled for NRZ coding with pre-emphasis, a check can then be made for possible PAM4 coding enablement of the other device, and if found, both devices switched to PAM4 coding.

Figure 5:
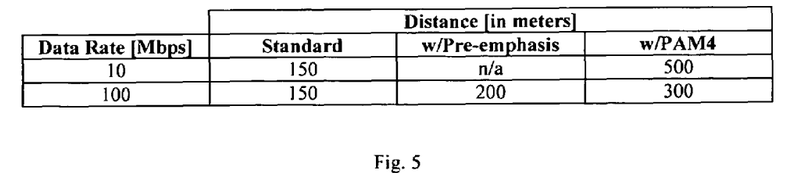
FIG. 5 is a distance chart comparing standard Ethernet distances to distances achieved in a system in accordance with the disclosed invention.

Referring to FIG. 5, there is shown a table of distances comparing the distance advantage of the disclosed invention over prior art solutions. For 10 Mbps data rate the standard requires operation up to the range of 150 meters. By using the PAM4 encoding, the disclosed system is capable of reaching at least a distance of 500 meters. For 100 Mbps data rate the standard 150 meters is extended to at least 200 meters by the use of the disclosed pre-emphasis technique, and to at least 300 meters when PAM4 coding is used.

The foregoing disclosure is of a preferred embodiment of the invention. It should be understood that other embodiments will be apparent to those skilled in the art, and that the various aspects of the invention may be practiced in sub-combinations as desired. Thus while a preferred embodiment of the present invention has been disclosed and described herein for purposes of illustration and not for purposes of limitation, it will be understood by those skilled in the art that various changes in form and detail may be made therein without departing from the spirit and scope of the invention.

What is claimed is:

1. An Ethernet PHY adapted to support long-range communication over a twisted pair in at least 10 Mega bits per second (Mbps) and 100 Mbps transmission, the PHY comprising:
    a first transmitter and a first receiver having an input and an output, respectively, adapted to couple to a media access unit, the first transmitter and the first receiver being configured to handle physical link signaling (PLS) and physical coding sub-layer (PCS);
    a second transmitter and a second receiver having an input and an output, respectively, coupled to an output and an input of the first transmitter and the first receiver, respectively, the second transmitter and a second receiver being configured to handle physical medium attachment (PMA) and the physical medium dependent (PMD) sub-layer functions;
    a digital to analog converter (DAC) having an input coupled to the output of the second transmitter and an output coupled to the twisted pair, the DAC being configured to transfer data from the digital to the analog domain with selective pre-emphasis to the twisted pair;
    an analog to digital converter (ADC) with equalization capabilities configured to transfer analog data received from the twisted pair to digital data, an output of the ADC being coupled to an input of the second receiver; and,
    an extended auto-negotiation unit having an input coupled to an output of the second receiver and an output coupled to an input of the second transmitter and configured to determine the distance between the PHY and a second PHY and resetting of the signal coding when operating in a long-range mode;
    wherein the long-range for the 10 Mbps transmission is at least up to 500 meters and wherein the at least up to 500 meters is achieved by sending a stream of symbols, each symbol representing at least 2 bits.

2. The PHY of claim 1 wherein the twisted pair is shielded.

3. The PHY of claim 1 wherein the twisted pair is unshielded.

4. The PHY of claim 1 wherein the symbols are sent using four level pulse amplitude modulation (PAM4) coding.

5. The PHY of claim 1 wherein the long-range for the 100 Mbps transmission is at least up to 200 meters.

6. The PHY of claim 5 wherein the 200 meters is achieved by activating pre-emphasis on NRZ coding whenever two consecutive bits have the same value.

7. The PHY of claim 6 wherein the DAC includes a digital signal processor adapted to generate the selective pre-emphasis.

8. The PHY of claim 1 wherein determining the distance for 10 Mbps transmission comprises the determination of the second PHY being at a distance exceeding the standard distance for a 10 Mbps Ethernet communication.

9. The PHY of claim 1 wherein the distance measurement is performed by using at least a digital signal processor in the ADC.

10. The PHY of claim 1 wherein the distance measurement is performed by using at least a digital signal processor in the DAC.

11. The PHY of claim 1 wherein the Ethernet is 10BASE-T for the 10 Mbps communication and 100BASE-TX for the 100 Mbps communication.

12. The-An Ethernet PHY adapted to support long-range communication over a twisted pair in at least 10 Mega bits per second (Mbps) and 100 Mbps transmission, the PHY comprising:

a first transmitter and a first receiver having an input and an output, respectively, adapted to couple to a media access unit, the first transmitter and the first receiver being configured to handle physical link signaling (PLS) and physical coding sub-layer (PCS);

a second transmitter and a second receiver having an input and an output, respectively, coupled to an output and an input of the first transmitter and the first receiver, respectively, the second transmitter and a second receiver being configured to handle physical medium attachment (PMA) and the physical medium dependent (PMD) sub-layer functions;

a digital to analog converter (DAC) having an input coupled to the output of the second transmitter and an output coupled to the twisted pair, the DAC being configured to transfer data from the digital to the analog domain with selective pre-emphasis to the twisted pair;

an analog to digital converter (ADC) with equalization capabilities configured to transfer analog data received from the twisted pair to digital data, an output of the ADC being coupled to an input of the second receiver; and, an extended auto-negotiation unit having an input coupled to an output of the second receiver and an output coupled to an input of the second transmitter and configured to determine the distance between the PHY and a second PHY and resetting of the signal coding when operating in a long-range mode;

wherein the long-range for the 100 Mbps transmission is at least up to 300 meters, wherein the at least up to 300 meters is achieved by activating pre-emphasis on NRZ coding whenever two consecutive bits have the same value, and wherein the at least up to 300 meters is achieved by sending symbols of at least 2 bits each.

13. The PHY of claim 12 wherein the symbols are sent using four level pulse amplitude modulation PAM4 coding.

14. An Ethernet PHY adapted to support long-range communication over a twisted pair in at least 10 Mega bits per second (Mbps) and 100 Mbps transmission, the PHY comprising:

a first transmitter and a first receiver having an input and an output, respectively, adapted to couple to a media access unit, the first transmitter and the first receiver being configured to handle physical link signaling (PLS) and physical coding sub-layer (PCS);

a second transmitter and a second receiver having an input and an output, respectively, coupled to an output and an input of the first transmitter and the first receiver, respectively, the second transmitter and a second receiver being configured to handle physical medium attachment (PMA) and the physical medium dependent (PMD) sub-layer functions;

a digital to analog converter (DAC) having an input coupled to the output of the second transmitter and an output coupled to the twisted pair, the DAC being configured to transfer data from the digital to the analog domain with selective pre-emphasis to the twisted pair;

an analog to digital converter (ADC) with equalization capabilities configured to transfer analog data received from the twisted pair to digital data, an output of the ADC being coupled to an input of the second receiver; and, an extended auto-negotiation unit having an input coupled to an output of the second receiver and an output coupled to an input of the second transmitter and configured to determine the distance between the PHY and a second PHY and resetting of the signal coding when operating in a long-range mode;

wherein determining the distance for 100 Mbps transmission comprises the determination of the second PRY being at a distance exceeding the standard distance for a 100 Mbps Ethernet communication, and further determining if the distance is within a first distance greater than the standard distance or within a second distance greater than the first distance.

15. The PHY of claim 14 wherein the first distance is up to 200 meters.

16. The PHY of claim 14 wherein the second distance is a distance of at least 300 meters.

17. An Ethernet PHY adapted to support long-range communication over a twisted pair in at least 10 Mega bits per second (Mbps) and 100 Mbps transmission, the PHY comprising:

a first transmitter and a first receiver having an input and an output, respectively, adapted to couple to a media access unit, the first transmitter and the first receiver being configured to handle physical link signaling (PLS) and physical coding sub-layer (PCS);

a second transmitter and a second receiver having an input and an output, respectively, coupled to an output and an input of the first transmitter and the first receiver, respectively, the second transmitter and a second receiver being configured to handle physical medium attachment (PMA) and the physical medium dependent (PMD) sub-layer functions;

a digital to analog converter (DAC) having an input coupled to the output of the second transmitter and an. output coupled to the twisted pair, the DAC being configured to transfer data from the digital to the analog domain with selective pre-emphasis to the twisted pair;

an analog to digital converter (ADC) with equalization capabilities configured to transfer analog data received from the twisted pair to digital data, an output of the ADC being coupled to an input of the second receiver; and, an extended auto-negotiation unit having an input coupled to an output of the second receiver and an output coupled to an input of the second transmitter and configured to determine the distance between the PHY and a second PHY and resetting of the signal coding when operating in a long-range mode;

wherein the long-range for the 100 Mbps transmission is at least up to 200 meters, wherein the at least 200 meters is achieved by activating pre-emphasis on NRZ coding whenever two consecutive bits have the same value, and wherein the pre-emphasis emphasizes at least a first bit from a series of bits having the same value.

18. The PHY of claim 17 wherein the pre-emphasis comprises a transmission value for the first bit of a value which is higher than an immediately following bit.

19. The PHY of claim 17 wherein the pre-emphasis is performed using at least a finite impulse response (FIR) filter.

* * * * *

UNITED STATES PATENT AND TRADEMARK OFFICE
CERTIFICATE OF CORRECTION

PATENT NO. : 7,602,806 B2  Page 1 of 1
APPLICATION NO. : 11/005686
DATED : October 13, 2009
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1271 days.

Signed and Sealed this

Fourteenth Day of December, 2010

David J. Kappos
*Director of the United States Patent and Trademark Office*